April 10, 1945.　　　F. F. FRAKES　　　2,373,467
AIRPLANE
Filed May 10, 1943　　　3 Sheets-Sheet 1

F. F. Frakes
INVENTOR.

BY

April 10, 1945.   F. F. FRAKES   2,373,467
AIRPLANE
Filed May 10, 1943   3 Sheets-Sheet 2
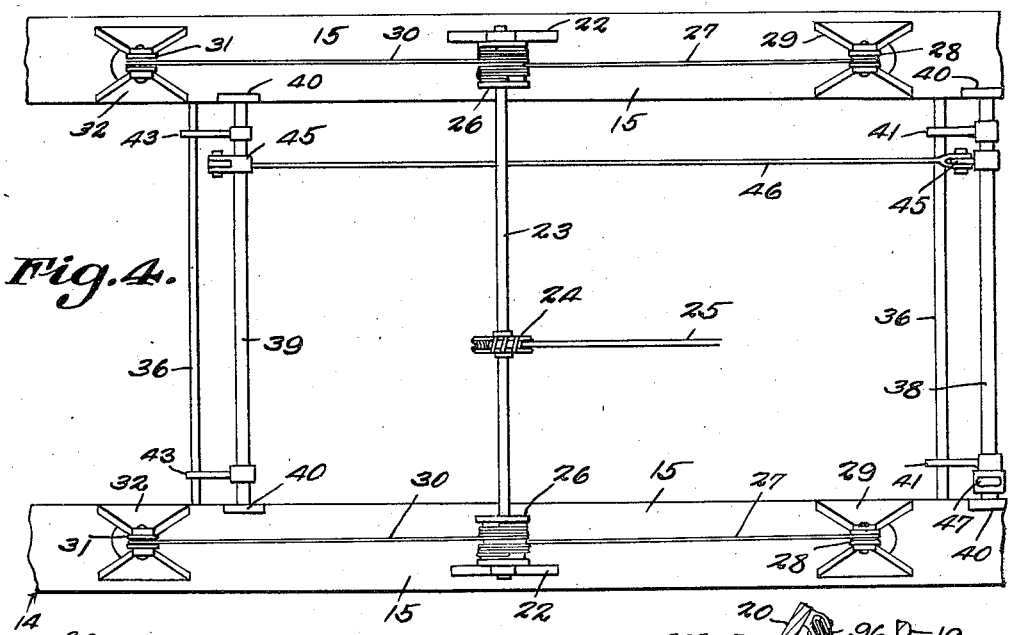
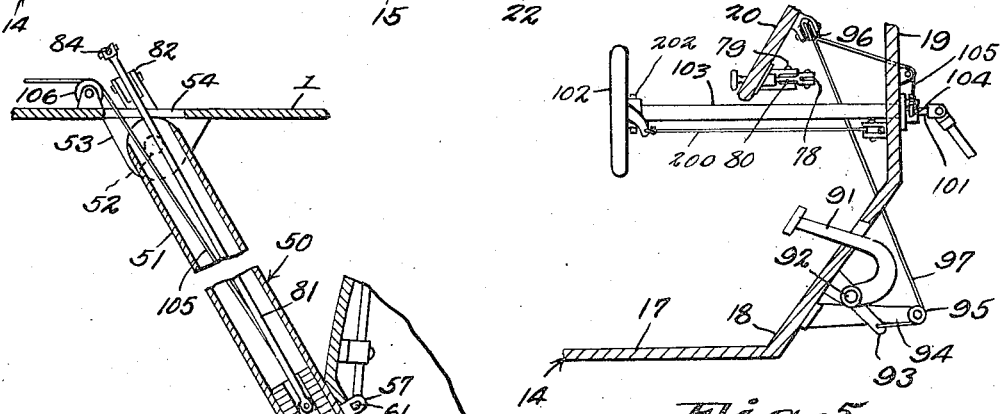
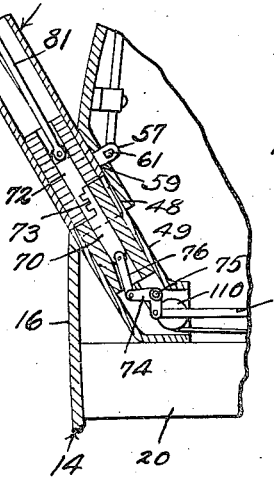
INVENTOR.

April 10, 1945.　　　F. F. FRAKES　　　2,373,467
AIRPLANE
Filed May 10, 1943　　　3 Sheets-Sheet 3
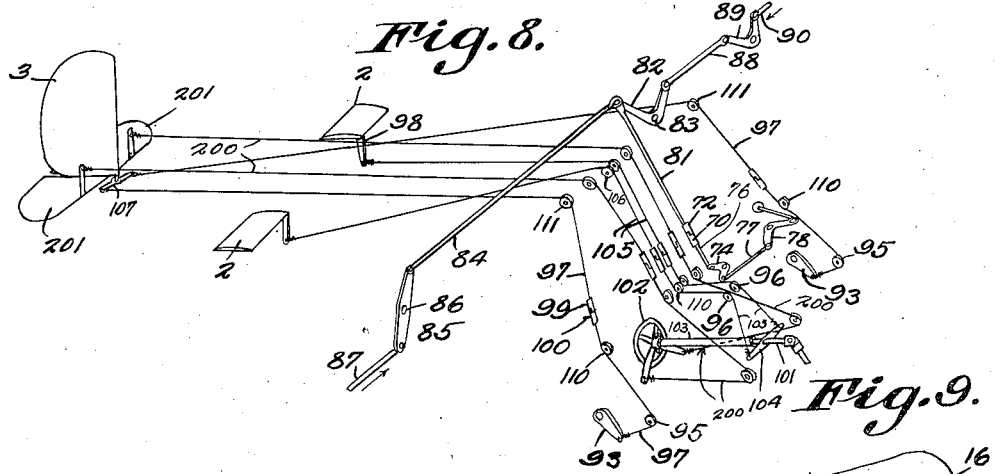
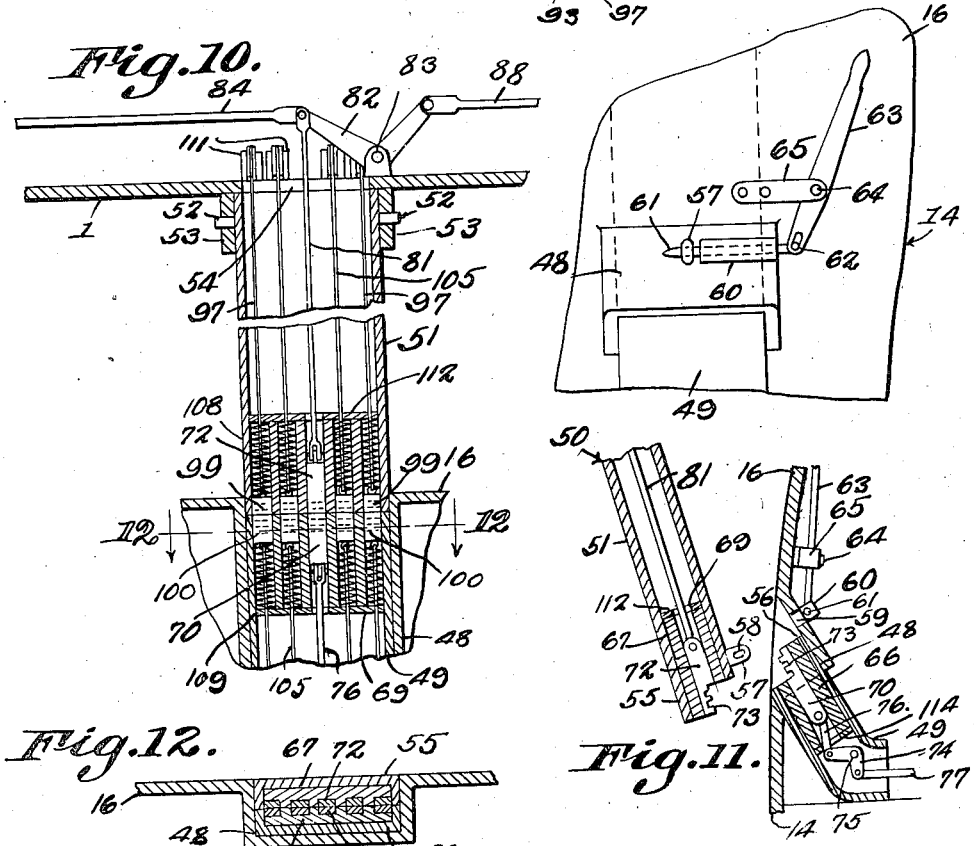
F. F. Frakes
INVENTOR.
BY 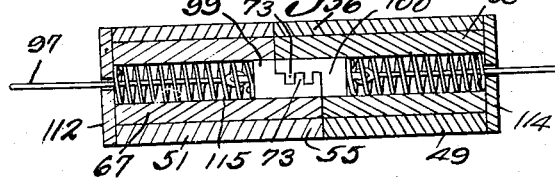

Patented Apr. 10, 1945

2,373,467

UNITED STATES PATENT OFFICE 2,373,467

AIRPLANE

Frank F. Frakes, Columbia, Tenn.

Application May 10, 1943, Serial No. 486,372

6 Claims. (Cl. 244—2)

This invention aims to provide novel means whereby an automobile may be coupled up with an airplane, to serve as the fuselage therefor, the essential parts of the airplane being manipulated from within the automobile, and it being possible to separate the automobile from the airplane and use the automobile as a land vehicle, novel means being provided for effecting an operative connection between the movable controlling parts of the automobile and the parts on the airplane, which are to be controlled.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 4 is a bottom plan showing the structure on the automobile whereby the airplane may be raised and lowered;

Fig. 5 is a vertical sectional view, showing the controls for the steering mechanism of the airplane and for the ailerons;

Fig. 6 is a horizontal section showing the throttle plunger and attendant parts;

Fig. 7 is a vertical section taken through the housing or conduit which contains certain of the detachable connecting parts;

Fig. 8 is a diagrammatic view illustrating the controls;

Fig. 9 is an elevation showing a part of the mechanism whereby the sections of the conduit are held together;

Fig. 10 is a longitudinal section of the conduit which contains certain of the working parts, parts being broken away;

Fig. 11 is a composite view showing the parts of the conduit separated;

Fig. 12 is a cross section on the line 12—12 of Fig. 10;

Fig. 13 is a longitudinal section taken through the portion of the device which contains the detachably interengageable latches.

Figure 1:
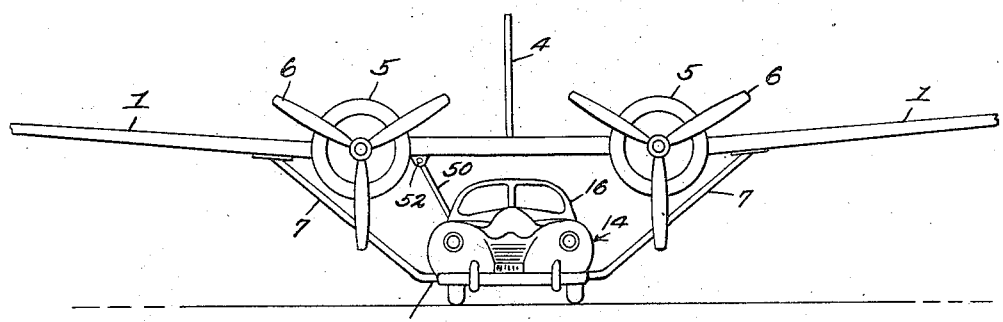
Fig. 1 shows in front elevation, a device constructed in accordance with the invention.
Figure 2:
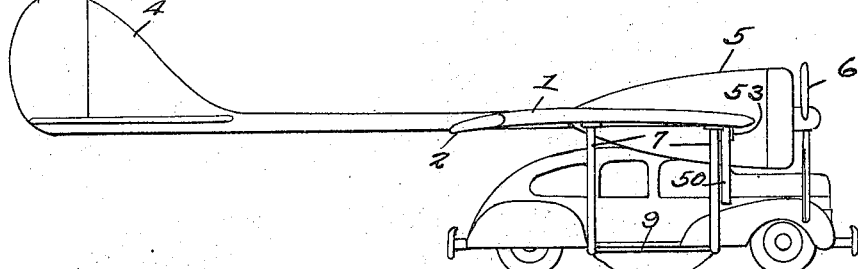
Fig. 2 is a side elevation.

In the drawings, there is shown an airplane comprising wings 1, the ailerons being shown at 2. The numeral 3 designates a rudder, mounted at 4 for swinging movement on a vertical axis, supposing that the wings 1 are horizontal. The airplane is powered by any desired number of engines 5, operating propellers 6.

Depending hangers 7 are provided, and are spaced apart longitudinally of the airplane, the hangers being connected at their upper ends to the wings 1, and each hanger comprising a straight, lower, intermediate portion 8. The straight portions 8 of the hangers 7 are connected by any desired number of braces 9, one of which is shown in Fig. 3.

Upstanding keepers 10, in the form of blocks, are secured to the straight portions 8 of the hangers 7, at the braces 9, if desired, the keepers having bluntly conical upper ends 11. Connectors 12, in the form of rings, are secured to the tapered upper ends 11 of the keepers 10.

The numeral 14 designates an automobile, including a frame 15 and a body 16 carried by the frame. The floor of the automobile body is marked by the numeral 17 in Fig. 5, the foot board appearing at 18, and being connected to a cross piece 19, carrying an instrument board 20, all as usual.

Figure 3:
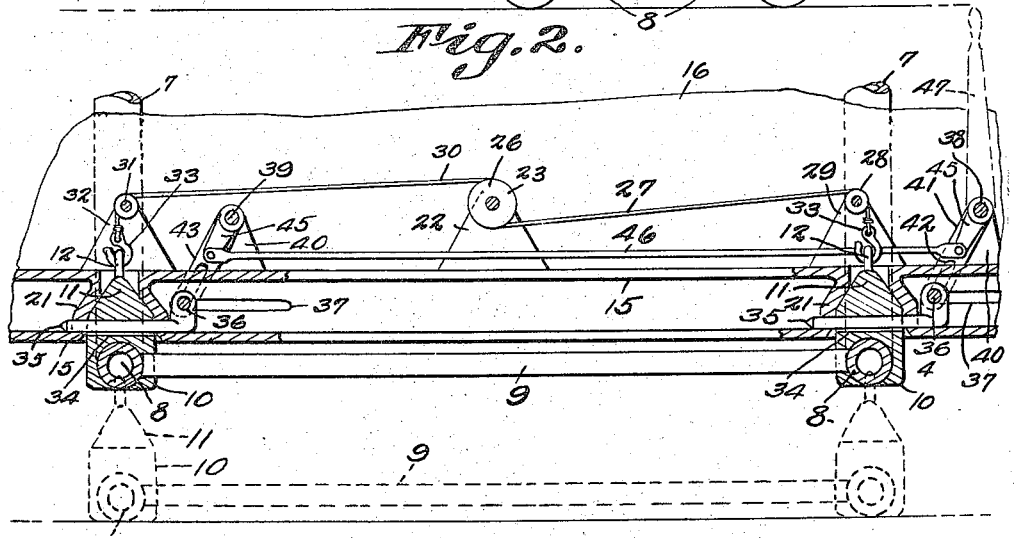
Fig. 3 is a longitudinal section showing the means whereby the airplane may be raised and lowered with respect to the automobile.

The side portions of the frame 15 carry tapered sockets 21, as shown in Fig. 3. The sockets 21 are adapted to receive the tapered upper ends 11 of the keepers 10 on the straight portions 8 of the hangers 7 of the airplane.

It appears in Figs. 4 and 3 that, intermediate their ends, the side portions of the auto frame 15 carry upwardly extended intermediate brackets 22, wherein a driven, transverse shaft 23 is mounted to rotate. By means of a worm and pinion drive 24, or other suitable instrumentality, the transverse shaft 23 is operatively connected to a driving shaft 25, connected operatively with the engine (not shown) of the automobile 14.

Drums 26 are secured to the shaft 23, and about the drums are wound, in one direction, flexible elements 27. The flexible elements 27 extend forwardly and downwardly, about pulleys 28, journaled on brackets 29, carried by the side portions of the automobile frame 15. Flexible elements 30 are wound in a direction opposite to that of the flexible elements 27, about the drums 26, the flexible elements 30 extending rearwardly and downwardly about pulleys 31, journaled on upstanding brackets 32, carried by the sides of the frame 15, and disposed to the rear of the brackets 22. The depending ends of the flexible elements 27 and 30 are supplied with hooks 33, adapted to be engaged in the rings 12 on the upper ends 11 of the keepers 10.

Suppose that the automobile 14 is free of the airplane, the straight portions 8 of the hangers 7 of the airplane resting on the ground. Under such conditions, the automobile 14 may be driven about, as a land vehicle, and independently of the airplane.

When it is desired to assemble the airplane with the automobile, the automobile is driven through the hangers 7, the straight portions 8 of the hangers then being underneath the frame 15 of the automobile.

The shaft 25 of Fig. 4 is put into operation by the engine (not shown) of the automobile 14. The worm and pinion drive 24 actuates the shaft 23 and the drums 26. The flexible elements 27 and 30 are wound about the drums, and since those flexible elements are connected releasably, by means of the hooks 33 and the eyes or rings 12 on the tapered ends 11 of the keepers 12 on the straight portions 8 of the hangers 7, the airplane will be lifted until the tapered ends 11 of the keepers 10 are seated firmly in the sockets 21 on the framework 15 of the automobile.

The mechanism for holding the parts assembled, as last hereinbefore described, will now be set forth.

The keepers 10 have transverse seats or openings 34, adapted to receive forward and rear locking bolts 35, slidably mounted on the lower portions of the frame 15 and in the sockets 21. The forward ends of the bolts 35 receive forward and rear cross rods 36, adapted to move transversely in slots 37, formed in the side portions of the vehicle frame 1.

A forward shaft 38 is provided, and the numeral 39 designates a rear shaft, these shafts being mounted to rock in upstanding bearings 40 on the sides of the frame 15. The shaft 38 carries depending arms 41, which are slotted longitudinally as at 42, to receive the forward cross rod 36. The rear shaft 39 has depending arms 43, which are slotted to receive the rear cross rod 36.

The shafts 38 and 39 are supplied, each, with a depending arm 45, and to the lower portions of the arms, the ends of a rigid connecting rod 46 are pivoted. An operating handle 47 is secured to the forward shaft 38, near one end thereof, as disclosed in Figs. 4 and 3.

By means of the handle 47, rocking movement may be imparted to the shaft 38, and corresponding movement is imparted to the shaft 39, by means of the crank arms 45 and rod 46 which is joined to them. When the rod 46 is actuated, the arms 41 and 43 slide the bolts 35 into the seats 34 in the parts 11 of the keepers 10, and, thus, the tapered ends 11 of the keepers are held in the sockets 21 on the vehicle frame 15, the vehicle thus being coupled to the airplane. By a reverse movement of the lever 47, the bolts 35 may be withdrawn from engagement with the parts 11 of the keepers 10, the airplane being lowered, to bring the straight portions 8 of the hangers 7 into contact with the ground, and, then, the vehicle may be driven away, the hooks 33 of Fig. 3 having been detached from the rings or connections 12.

It is contemplated that the airplane shall be operated from within the automobile 14, and means to that end will now be specified.

An inwardly inclined socket 48 is formed on the side wall of the body 16 of the automobile. The lower member 49 of an upwardly and laterally inclined conduit 50 is secured in the socket 48 and may be secured to a portion of the framework 15 of the automobile. The conduit 50 includes an upper member 51, which is pivoted at 52 to ears 53 on the wings, for movement transversely of the line of advance of the airplane. There is an opening 54 in the wings 1, immediately above the upper end of the upper member 51 of the conduit 50, as Fig. 10 shows.

Noting Fig. 11, the upper member 51 of the conduit 50 is cut away to form a longitudinal projection 55, the lower member 49 of the conduit being cut away to form a transversely mating longitudinal projection 56. The upper member 51 of the conduit 50 is supplied near its lower end with a laterally projecting ear 57, having a hole 58. The ear 57 is adapted to be extended through an opening 59 in the socket 48.

Referring to Figs. 11 and 9, a guide 60 is mounted on the socket 48, and in the guide, a latch bolt 61 is mounted for reciprocation. The outer end of the latch bolt 61 is pivoted at 62 to a lever 63, fulcrumed at 64 on a support 65 carried by the side wall of the car body 16.

Within the lower member 49 of the conduit 50 is secured a guide 66, a guide 67 being secured in the upper member 51 of the conduit. The guides 66 and 67 are cut away to conform to the projections 56 and 55 of the conduit members 49 and 51. A latch 70 is mounted to slide longitudinally in the guide 66 of the lower conduit member 49, and a latch 72 is similarly mounted in the guide 67 of the upper member of the conduit. The latches 70 and 72 have transverse, interfitting teeth 73.

When the upper member 51 of the conduit (Fig. 11) is swung into engagement with the lower member 49 thereof, the teeth 73 will interlock, and, thus, latches 70 and 72 will be connected for longitudinal movement as one piece. The bolt 61 of Fig. 9 is advanced by the lever 63 into the hole 58 of the ear 57, to hold the conduit members 49 and 51 in axial alinement at their meeting ends.

A bell crank lever 74 is fulcrumed at 75 in the conduit part 49. The upper end of a link 76 is pivoted to the latch 70, the lower end of the link being pivoted to one arm of the bell crank lever 74. The other arm of the bell crank lever 74 is pivoted to a connection 77, in the form of a rod, the connection 77 being pivoted to one arm of a bell crank lever 78, fulcrumed at 79 on the instrument board 20 of the automobile 14. The bell crank lever 78 is actuated by a throttle plunger 80, mounted to reciprocate in the instrument board 20, as shown in Fig. 6.

The lower end of a connecting rod 81 is pivoted to the latch 72, the upper end of the connecting rod being pivoted to one arm of a bell crank lever 82, located and fulcrumed, as shown at 83, within the airplane wings 1.

The pivot element that joins the connecting rod 81 to one arm of the bell crank lever 82, joins, thereto, pivotally, the inner end of a connecting rod 84, the outer end of which is pivoted to a lever 85 of the first order, fulcrumed at 86 on the wing. To the lower end of the lever 85 is pivoted a rod or the like 87, which is a throttle rod for one of the engines 5 of the airplane.

The other arm of the bell crank lever 82 is pivoted to a rod 88 or the like, having its outer end pivoted to one arm of a bell crank lever 89, fulcrumed on the wing, a connecting rod 90 being pivoted to the other arm of the bell crank lever 89, the rod 90 being a throttle rod for the other of the engines 5 of the airplane.

It will now be noted that the engines 5 of the airplane may be throttled by a train of parts comprising plunger 80 of Fig. 6, the bell crank lever 78, the connection 77, the bell crank lever 74, the link 76, the interengaged latches 70 and 72, the connection 81, the bell crank lever 82, and the connecting rods 84 and 88, together with bell crank lever 89 and the rod 90, and the lever 85 and the connection 87. Thus, the engines 5 of the airplane are throttled from the plunger or its equivalent, shown in Fig. 8.

One of the usual pedals of the automobile is marked by the numeral 91 in Fig. 5 and is pivotally mounted on the foot board 18, as shown at 92. A forwardly presented arm 93 is connected to each of the pedals, 91, to move therewith. The foot board 18 carries forwardly extended projections 94, whereon pulleys 95 are journaled. Pulleys 96 are mounted to rotate on the instrument board 20 and pulleys 110 are mounted in the lower part 49 of the conduit member 50. Flexible elements 97 have their lower ends connected to the arms 93 which move with the pedals 91. The flexible elements 97 are extended around the pulleys 95, 96 and 110, and backwardly over one pair of pulleys 111 on the airplane, to a cross arm 107 on the rudder 3. In view of the foregoing, the rudder 3 may be operated by a train of parts including the pedals 91, the flexible elements 97, and the cross arm 107, the source of force application being the pedals 91.

Latches 99 and 100 are interposed in the flexible elements 97, these latches corresponding to the latches 72 and 70 of Fig. 11, and being toothed for releasable interengagement, after the manner shown at 73 in Fig. 11.

The steering column of the automobile is indicated by the numeral 103, and in it is journaled a steering shaft 101, carrying a steering wheel 102, which is tiltably mounted at 202. Fixed to the lower end of the steering shaft 101 is a cross arm 104. The lower ends of flexible elements 105 are connected to the ends of the cross arm 104 and are extended upwardly and backwardly over guide pulleys 96, 110 and 106 to the ailerons 2. The tiltable steering wheel 102 is connected to flexible elements 200 connected to elevators 201 at the tail of the aircraft. The controls for the airplane are conventional, and Fig. 8 and the corresponding description are introduced merely to make it plain to pilots and others that the device forming the subject matter of this application does not call for a specially constructed airplane or make it necessary to re-learn the details of pilotage.

In the flexible elements 105 are interposed latches 108 and 109, the latches 108 corresponding to the latches 72 of Fig. 11, and the latches 109 corresponding to the latches 70, the latches 108 and 109 being toothed, for lateral engagement, as shown at 73 and 71 in Fig. 11.

An abutment plate 112 is fixed in the conduit part, at the upper end of the guide 67 and an abutment plate 114 is fixed in the conduit part 49 at the lower end of the guide 66. Compression springs 115 are interposed between the abutment plate 112 and the upper latches, such as the latch 99, and between the abutment plate 114 and the lower latches, such as the latch 100. The springs 115 constitute return springs for the several latches and when the springs are in neutral condition, the teeth on corresponding latches are so located relatively to each other (Fig. 11) that they will intermesh and connect the latches when the conduit part 51 is swung to the right in that figure.

The operation of the device has been set forth hereinbefore, step by step, but, briefly, is as follows:

The airplane is lifted by the flexible elements 27 and 30 of Fig. 3, until the tapered ends 11 of the keepers 10 on the airplane enter the socket 21 on the automobile frame, the flexible elements receiving motion from the drums 26, the shaft 23, the shaft 25 and the driving connection 24 of Fig. 4. The lever 47 advances the locking bolts 35 and couples the keepers 10 on the airplane to the sockets 21 on the automobile. A throttling of the engines 5 on the airplane is brought about by manipulating the plunger 80 of Fig. 6, the plunger acting through a train of parts ending with the connections 87 and 90 of Fig. 9, to bring about the aforesaid throttling.

Generally stated, an operator is provided with an airplane of which an automobile constitutes the fuselage. The airplane can be raised for engagement with the automobile and lowered and separated from the automobile, whereupon the automobile may be driven off as a land vehicle.

What is claimed is:

1. In a device for aerial navigation, an aircraft, a depending hanger carried by the aircraft and comprising a ground-engaging portion, the hanger constituting means for supporting the aircraft on the ground or the like, an automobile, the vertical distance between the ground-engaging portion and the aircraft being greater than the height of the automobile, whereby the automobile may be advanced across the hanger without striking the aircraft, and mechanism operated by the propelling means of the automobile for raising the aircraft, with respect to the automobile, until the hanger engages beneath the automobile.

2. In a device for aerial navigation, an aircraft, a depending hanger carried by the aircraft and comprising a ground-engaging portion, the hanger constituting means for supporting the aircraft on the ground or the like, an automobile, the vertical distance between the ground-engaging portion and the aircraft being greater than the height of the automobile, whereby the automobile may be advanced across the hanger without striking the aircraft, mechanism operated by the propelling means of the automobile for raising the aircraft, with respect to the automobile, until the hanger engages beneath the automobile, and manually operable interlocking parts on the aircraft and on the automobile, respectively, to releasably fasten the aircraft to the automobile in flight position and permit detachment of the automobile and aircraft when it is desired to separate said automobile and aircraft.

3. In a device for aerial navigation, an aircraft, a depending hanger carried by the aircraft and comprising a ground-engaging portion, the hanger constituting means for supporting the aircraft on the ground or the like, an automobile, the vertical distance between the ground-engaging portion and the aircraft being greater than the height of the automobile, whereby the automobile may be advanced across the hanger without striking the aircraft, and mechanism for raising the aircraft until the hanger engages beneath the automobile, said mechanism comprising a driven shaft journaled on the automobile, oppositely extending flexible elements wound in opposite directions about the shaft, direction-changing idlers on opposite sides of the shaft and over which the flexible elements pass downwardly, and releasably interengaged parts located below the idlers, and carried, respectively, by the lower portions of the flexible elements, and by the aircraft.

4. In a device for aerial navigation, an aircraft, a depending hanger carried by the aircraft and comprising a ground-engaging portion, the hanger constituting means for supporting the aircraft on the ground or the like, an automobile, the vertical distance between the ground-engaging portion and the aircraft being greater than the height of the automobile, whereby the automobile may be advanced across the hanger without striking the aircraft, locking devices on the automobile and engaged with the aircraft to fasten the aircraft to the automobile, and mechanism for actuating the locking devices, said mechanism comprising spaced shafts journaled on the automobile and having first and second crank arms, means for pivoting the first crank arms to the locking devices, a connection, means for pivoting the second arms to the connection, and means under the control of an operator for actuating one of the shafts.

5. In a device for aerial navigation, an aircraft having substantially vertical sockets, a depending hanger carried by the aircraft and comprising a ground-engaging portion, the hanger constituting means for supporting the aircraft on the ground or the like, an automobile, the vertical distance between the ground-engaging portion and the aircraft being greater than the height of the automobile, whereby the automobile may be advanced across the hanger without striking the aircraft, keepers on the hanger and shaped to be received in the sockets, means on the automobile for raising the aircraft until the keepers engage in the sockets, locking devices movably supported on the automobile and engageable with the keepers to fasten the aircraft to the automobile, and mechanism under the control of an operator for actuating the locking devices.

6. In a device for aerial navigation, an aircraft, a depending hanger carried by the aircraft and comprising a ground-engaging portion, the hanger constituting means for supporting the aircraft on the ground or the like, an automobile, the vertical distance between the ground-engaging portion and the aircraft being greater than the height of the automobile, whereby the automobile may be advanced across the hanger without striking the aircraft, mechanism for raising the aircraft until the hanger engages beneath the automobile, means for fastening the aircraft to the automobile after the aircraft has been raised, a conduit comprising separable parts, one of which is carried by the automobile, the other of which is carried by the aircraft, means for holding the conduit-parts together at their inner ends, in substantial alinement, a movable flight controlling part on the aircraft, an operating member on the automobile, a connection between the operating member and the flight controlling part and passing through the conduit, and a separable coupling device interposed in the connection and located closely adjacent to the means for holding the conduit parts together.

FRANK F. FRAKES.